US011714289B2

(12) United States Patent
Lee et al.

(10) Patent No.: US 11,714,289 B2
(45) Date of Patent: Aug. 1, 2023

(54) MULTI-IMAGE DISPLAY APPARATUS PROVIDING HOLOGRAPHIC IMAGE

(71) Applicants: SAMSUNG ELECTRONICS CO., LTD., Suwon-si (KR); SEOUL NATIONAL UNIVERSITY R&DB FOUNDATION, Seoul (KR)

(72) Inventors: Changkun Lee, Seoul (KR); Seokil Moon, Seoul (KR); Byoungho Lee, Seoul (KR); Sunil Kim, Seoul (KR); Bongsu Shin, Seoul (KR); Hongseok Lee, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 637 days.

(21) Appl. No.: 16/683,643

(22) Filed: Nov. 14, 2019

(65) Prior Publication Data
US 2020/0264441 A1 Aug. 20, 2020

(30) Foreign Application Priority Data

Feb. 19, 2019 (KR) ........................ 10-2019-0019191

(51) Int. Cl.
G02B 27/01 (2006.01)
G02B 5/30 (2006.01)
(Continued)

(52) U.S. Cl.
CPC ....... *G02B 27/0179* (2013.01); *G02B 5/3025* (2013.01); *G02B 27/0172* (2013.01);
(Continued)

(58) Field of Classification Search
CPC .... G02B 27/00; G02B 27/01; G02B 27/0172; G02B 27/4211; G02B 27/005;
(Continued)

(56) References Cited

U.S. PATENT DOCUMENTS

2009/0296176 A1* 12/2009 Leister ................ G03H 1/2286
359/9
2018/0107000 A1 4/2018 Sung et al.
(Continued)

FOREIGN PATENT DOCUMENTS

EP 3091400 A1 11/2016
EP 3 351 978 A1 7/2018
(Continued)

OTHER PUBLICATIONS

Communication dated May 11, 2020, issued by the European Patent Office in counterpart European Application No. 19203070.8.
(Continued)

*Primary Examiner* — Stephone B Allen
*Assistant Examiner* — Jyotsna V Dabbi
(74) *Attorney, Agent, or Firm* — Sughrue Mion, PLLC

(57) ABSTRACT

A multi-image display apparatus includes a light source configured to emit a first wavelength light, a second wavelength light, and a third wavelength light, a spatial light modulator configured to modulate the first wavelength light, the second wavelength light, and the third wavelength light to form a first image including a first color holographic image, a second color holographic image, and a third color holographic image, a polarization selective lens configured to focus the first image having only a first polarization component and transmit a second image having only a second polarization component without refraction, the second image being provided to the polarization selective lens along a different path from the first image, wherein chro-
(Continued)

matic aberration of the polarization selective lens is offset by adjusting a depth of the first color holographic image, the second color holographic image, and the third color holographic image.

24 Claims, 14 Drawing Sheets

(51) Int. Cl.
    *G02B 27/28*     (2006.01)
    *G09G 3/02*     (2006.01)
    *G09G 5/02*     (2006.01)

(52) U.S. Cl.
    CPC ............. *G02B 27/283* (2013.01); *G09G 3/02* (2013.01); *G09G 5/026* (2013.01); *G02B 2027/0174* (2013.01); *G02B 2027/0185* (2013.01)

(58) Field of Classification Search
    CPC .. G02B 27/28; G02B 27/286; G02B 27/0179; G02B 2027/0174; G02B 2027/0112; G02B 2027/0116; G02B 5/30; G02B 5/3025; G03H 1/22; G03H 1/2294; G03H 225/35; G03H 225/52; G09G 3/02; G09G 5/026; G06T 19/006
    USPC ............................................................ 359/9
    See application file for complete search history.

(56) References Cited

U.S. PATENT DOCUMENTS

2018/0210222 A1    7/2018    Seo et al.
2018/0356639 A1*  12/2018  Schaefer .............. G02B 27/017
2020/0096816 A1    3/2020    Lee et al.

FOREIGN PATENT DOCUMENTS

EP           3 492 962 A2    6/2019
KR    10-2015-0102440 A    9/2015

OTHER PUBLICATIONS

Gun-Yeal Lee et al., "Supplementary Information Metasurface eyepiece for augmented reality", Nature Communication, Dec. 1, 2018, XP055689489, pp. 1-15.
Gun-Yeal Lee et al., "Metasurface eyepiece for augmented reality", Nature Communication, vol. 9, No. 1, Nov. 1, 2018, XP055590353, Total 10 pages.
Jun Wang et al., "Achromatization in Optical Reconstruction of Computer Generated Color Holograms", Journal of Display Technology, vol. 12, No. 4, Apr. 1, 2016, XP055263987, pp. 390-396.
Communication dated Mar. 19, 2021, from the European Patent Office in European Application No. 19203070.8.

* cited by examiner

MULTI-IMAGE DISPLAY APPARATUS PROVIDING HOLOGRAPHIC IMAGE

CROSS-REFERENCE TO RELATED APPLICATION

This application claims priority from Korean Patent Application No. 10-2019-0019191, filed on Feb. 19, 2019, in the Korean Intellectual Property Office, the disclosure of which is incorporated herein in its entirety by reference.

BACKGROUND

1. Field

Example embodiments of the present disclosure relate to a multi-image display apparatus such as an augmented reality system, and more particularly, to a multi-image display apparatus providing a holographic image.

2. Description of the Related Art

Recently, along with the development of electronic apparatuses and display apparatuses capable of implementing virtual reality (VR), interest in such apparatuses has increased. As a next step of VR, technology for implementing augmented reality (AR) and mixed reality (MR) has been researched.

Unlike VR that is based on a complete virtual world, AR is a display technique that shows the real world and overlapped (combined) virtual objects or information thereon, thereby further increasing the effect of reality. While VR is limitedly applied only to fields such as games or virtual experience, AR is advantageous in that it may be applied to various real environments. In particular, AR attracts the attention as next-generation display technology suitable for a ubiquitous environment or an Internet of things (IoT) environment. AR may be an example of MR in that it shows a mixture of the real world and additional information (virtual world).

SUMMARY

One or more example embodiments provide a multi-image display apparatus providing a holographic image.

Additional aspects will be set forth in part in the description which follows and, in part, will be apparent from the description, or may be learned by practice of example embodiments.

According to an aspect of an example embodiment, there is provided a multi-image display apparatus including a light source configured to emit a first wavelength light, a second wavelength light, and a third wavelength light, a spatial light modulator configured to modulate each of the first wavelength light, the second wavelength light, and the third wavelength light to form a first image including a first color holographic image, a second color holographic image, and a third color holographic image, a polarization selective lens configured to focus the first image having only a first polarization component and transmit a second image having only a second polarization component without refraction, the second image being provided to the polarization selective lens along a different path from the first image, wherein chromatic aberration of the polarization selective lens is offset by adjusting a depth of the first color holographic image, a depth of the second color holographic image, and a depth of the third color holographic image.

The light source may include a first light source configured to emit the first wavelength light, a second light source configured to emit the second wavelength light, and a third light source configured to emit the third wavelength light.

The multi-image display apparatus may further include a controller configured to provide first hologram data to the spatial light modulator while the first light source emits the first wavelength light, provide second hologram data to the spatial light modulator while the second light source emits the second wavelength light, and provide third hologram data to the spatial light modulator while the third light source emits the third wavelength light.

The polarization selective lens may have a first focal distance with respect to the first wavelength light, a second focal distance that is greater than the first focal distance with respect to the second wavelength light, and a third focal distance that is greater than the second focal distance with respect to the third wavelength light, and the controller may be further configured to adjust depth information of the first hologram data, the second hologram data, and the third hologram data based on the first focal distance, the second focal distance, and the third focal distance, respectively.

The controller may be further configured to adjust the depth information of the first hologram data such that the first color holographic image has a depth in which the first color holographic image is closer to the polarization selective lens than the second color holographic image by a difference between the second focal distance and the first focal distance, and adjust the depth information of the third hologram data such that the third color holographic image has a depth in which the third color holographic image is farther from the polarization selective lens than the second color holographic image by a difference between the third focal distance and the second focal distance.

The multi-image display apparatus may further include a controller configured to provide hologram data to the spatial light modulator while the first light source, the second light source, and the third light source simultaneously emit the first wavelength light, the second wavelength light, and the third wavelength light, respectively.

The polarization selective lens may have a first focal distance with respect to the first wavelength light, a second focal distance that is greater than the first focal distance with respect to the second wavelength light, and a third focal distance that is greater than the second focal distance with respect to the third wavelength light, and the controller may be further configured to adjust depth information of the hologram data based on the first focal distance, the second focal distance, and the third focal distance, respectively.

The controller may be further configured to adjust the depth information of the hologram data with respect to the first color holographic image such that the first color holographic image has a depth in which the first color holographic image is closer to the polarization selective lens than the second color holographic image by a difference between the second focal distance and the first focal distance, and adjust the depth information of hologram data with respect to the third color holographic image such that the third color holographic image has a depth in which the third color holographic image is farther from the polarization selective lens than the second color holographic image by a difference between the third focal distance and the second focal distance.

The multi-image display apparatus may further include a first polarization plate configured to transmit only the second polarization component from the second image, a beam splitter disposed on an optical path between the first polarization plate and the polarization selective lens, and a ¼ wavelength plate disposed between the beam splitter and the light source.

The beam splitter may be disposed on an optical path between the light source and the spatial light modulator, and the spatial light modulator may include a reflective-type light modulator configured to modulate reflected light.

The light source may include a laser light source configured to emit light having a first linear polarization component, and the first polarization component may include a first circular polarization component, and the second polarization component may include a second circular polarization component having a rotational direction opposite to a rotational direction of the first circular polarization component.

The light source may include a light-emitting diode configured to emit non-polarized light, the multi-image display apparatus may further include a second polarization plate disposed between the light source and the ¼ wavelength plate, and configured to transmit only the first linear polarization component, and the first polarization component may include a first circular polarization component, and the second polarization component may include a second circular polarization component having a rotational direction opposite to a rotational direction of the first circular polarization component.

The beam splitter may include a half-transparent mirror configured to reflect a portion of incident light and transmit a remaining portion of the incident light.

The beam splitter may include a polarization selective mirror configured to reflect light having the first circular polarization component and transmit light having the second circular polarization component.

The multi-image display apparatus may further include a first linear polarization plate configured to transmit only a first linear polarization component from the second image, a beam splitter on an optical path between the first linear polarization plate and the polarization selective lens, a first ¼ wavelength plate between the beam splitter and the spatial light modulator, and a second ¼ wavelength plate between the beam splitter and the polarization selective lens, wherein the first polarization component may include a first circular polarization component, and the second polarization component may include a second circular polarization component having a rotational direction opposite to a rotational direction of the first circular polarization component.

The beam splitter may be disposed on an optical path between the light source and the spatial light modulator, and the spatial light modulator may include a reflective-type light modulator configured to modulate reflected light.

The light source may include a laser light source configured to emit light having the first linear polarization component.

The light source may include a light-emitting diode configured to emit non-polarized light, and the multi-image display apparatus may further include a second linear polarization plate disposed between the light source and the beam splitter and configured to transmit only the first linear polarization component.

The beam splitter may include a polarization selective mirror configured to transmit light having the first linear polarization component and reflect light having a second linear polarization component that is orthogonal to the first linear polarization component.

The multi-image display apparatus may further include a linear polarization plate configured to transmit only a first linear polarization component from the second image, a beam splitter disposed on an optical path between the linear polarization plate and the polarization selective lens, and a ¼ wavelength plate disposed between the beam splitter and the polarization selective lens, wherein the first polarization component may include a first circular polarization component, and the second polarization component may include a second circular polarization component having a rotational direction opposite to a rotational direction of the first circular polarization component.

The spatial light modulator may be disposed on an optical path between the light source and the beam splitter, and the spatial light modulator may include a transmissive-type light modulator configured to modulate transmitted light.

The light source may include a laser light source configured to emit light having a second linear polarization component that is orthogonal to the first linear polarization component.

The multi-image display apparatus may further include a polarization plate configured to transmit only the second polarization component from the second image, a beam splitter disposed on an optical path between the polarization plate and the polarization selective lens, and a ¼ wavelength plate disposed between the spatial light modulator and the beam splitter, wherein the spatial light modulator may include a transmissive-type light modulator disposed between the light source and the beam splitter and configured to modulate transmitted light, and wherein the light source may include a laser light source configured to emit light having a second linear polarization component that is orthogonal to a first linear polarization component.

The multi-image display apparatus may further include a first beam splitter disposed between the light source and the spatial light modulator, a ¼ wavelength plate disposed between the first beam splitter and the light source, a polarization plate configured to transmit only the second polarization component from the second image, and a second beam splitter disposed on an optical path between the polarization plate and the polarization selective lens, wherein the second beam splitter is configured to reflect light having the first polarization component from the first beam splitter and transmit light having the second polarization component from the polarization plate.

The spatial light modulator may include a reflective-type light modulator configured to modulate reflected light.

The light source may include a laser light source configured to emit light having a first linear polarization component, and the first polarization component may include a first circular polarization component, and the second polarization component may include a second circular polarization component having a rotational direction opposite to a rotational direction of the first circular polarization component.

According to another aspect of an example embodiment, there is provided a multi-image display apparatus including a light source configured to emit a first wavelength light, a second wavelength light, and a third wavelength light, a spatial light modulator configured to modulate the first wavelength light, the second wavelength light, and the third wavelength light to form a first image including a first color holographic image, a second color holographic image, and a third color holographic image, a controller configured to provide to the spatial light modulator first hologram data corresponding to the first wavelength light, a second hologram data corresponding to the second wavelength light, and a third hologram data corresponding to the third wavelength light, and a polarization selective lens configured to focus the first image having a first polarization component and transmit a second image having a second polarization component without refraction, wherein the controller is further configured to offset chromatic aberration of the polarization selective lens by adjusting a depth of the first hologram data, a depth of the second hologram data, and a depth of the third hologram data such that the first color holographic image, the second color holographic image, and the third color holographic image are focused on a same image plane.

The polarization selective lens may have a first focal distance with respect to the first wavelength light, a second focal distance that is greater than the first focal distance with respect to the second wavelength light, and a third focal distance that is greater than the second focal distance with respect to the third wavelength light, and the controller may be further configured to adjust depth information of the first hologram data, the second hologram data, and the third hologram data based on the first focal distance, the second focal distance, and the third focal distance, respectively.

The polarization selective lens may include two geometric phase lenses and a polarization conversion plate disposed between the two geometric phase lenses, wherein each of the two geometric phase lenses may be configured to operate as convex lens or concave lens based on a polarization component of incident light.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
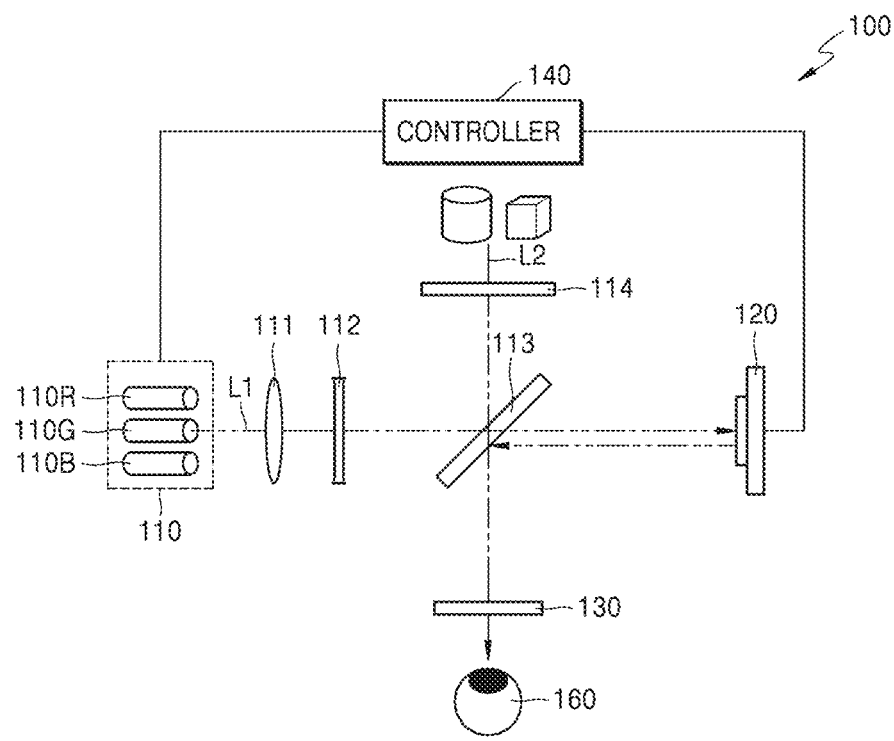
FIG. 1 is a schematic view illustrating a configuration of a multi-image display apparatus according to an example embodiment.

Hereinafter, a multi-image display apparatus providing a holographic image will be described in detail with reference to the accompanying drawings. In the drawings hereinafter, like reference numerals refer to like elements, and a size of each of components in the drawings may be exaggerated for clarity and convenience of explanation. In addition, example embodiments described hereinafter are only examples and various modifications may be possible based on the example embodiments.

Also, in layer structures described hereinafter, an expression, such as "above" or "on," may denote not only that an element is directly above/below/left to/right to another element by contacting the other element, but also that an element is indirectly above/below/left to/right to another element without contacting the other element. Terms such as "comprise" and/or "comprising" may be construed to denote a constituent element, but may not be construed to exclude the existence of or a possibility of addition of another constituent element. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a schematic view illustrating a configuration of a multi-image display apparatus 100 according to an example embodiment. Referring to FIG. 1, the multi-image display apparatus 100 according to an example embodiment may include a light source 110, a collimating lens 111, a ¼ wavelength plate 112, a beam splitter 113, a spatial light modulator 120, a circular polarization plate 114, a polarization selective lens 130, and a controller 140.

The light source 110, the spatial light modulator 120, and the controller 140 may perform a function of a holographic display apparatus for reproducing a holographic image. Also, the collimating lens 111 may perform a function of making light emitted from the light source 110 into parallel light. When the parallel light is directly emitted from the light source 110, the collimating lens 111 may be omitted. In order to provide a color holographic image, the light source 110 may include a red light source 110R that emits light in a red wavelength band, a green light source 110G that emits light in a green wavelength band, and a blue light source 110B that emits light in a blue wavelength band. Also, the light source 110 may be a coherent light source emitting coherent light. In order to provide light having relatively high coherence, for example, a laser diode (LD) may be used as the light source 110. In particular, the light source 110 may include a polarization laser emitting light linearly polarized in a specific direction.

The controller 140 may control operations of the light source 110 and the spatial light modulator 120. Also, the controller 140 may be an image signal processing device configured to provide hologram data containing information about a holographic image to be reproduced to the spatial light modulator 120. The spatial light modulator 120 may form a hologram pattern for diffracting and modulating incident light based on the hologram data provided from the controller 140. The spatial light modulator 120 may be any one of a phase modulator configured to perform only phase modulation, an amplitude modulator configured to perform only amplitude modulation, and a complex modulator configured to perform both phase modulation and amplitude modulation. The spatial light modulator 120 may be a reflected light modulator configured to modulate incident light by reflecting the incident light. For example, the spatial light modulator 120 may include a digital micro-mirror device (DMD), liquid crystal on silicon (LCoS), or a semiconductor modulator.

The ¼ wavelength plate 112, the beam splitter 113, and the circular polarization plate 114 may be included in an optical system configured to guide a first image that is a holographic image reproduced by the light source 110 and the spatial light modulator 120, and a second image that is an external image containing an actual external scene of a real world to the polarization selective lens 130. Then, a user may view the holographic image containing virtual reality or virtual information together with a background subject of the real world facing the user. Thus, the multi-image display apparatus 100 according to the example embodiment may be implemented to realize augmented reality (AR) or mixed reality (MR). In this case, the multi-image display apparatus may be a near-eye AR display apparatus.

The polarization selective lens 130 may be configured to focus incident light or transmit the incident light without refraction, based on a polarization state of the incident light. For example, the polarization selective lens 130 may focus light of a first circular polarization component having a first rotational direction, and may intactly transmit light of a second circular polarization component having a second rotational direction which is opposite to the first rotational direction without any change.

Figure 2:
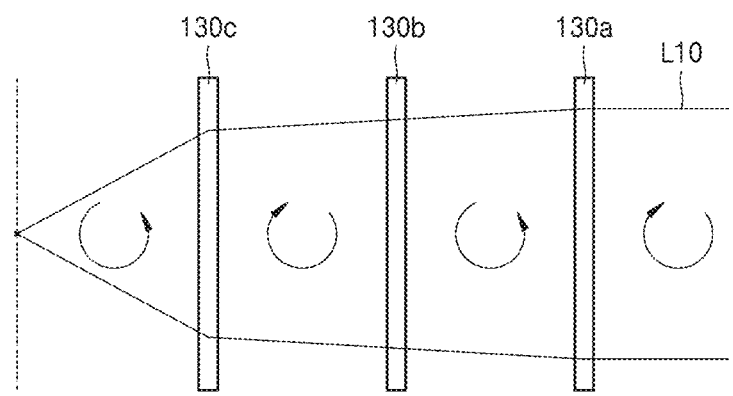
FIGS. 2 and 3 are schematic cross-sectional views illustrating an example configuration and operation of a polarization selective lens of the multi-image display apparatus illustrated in FIG. 1.
Figure 3:
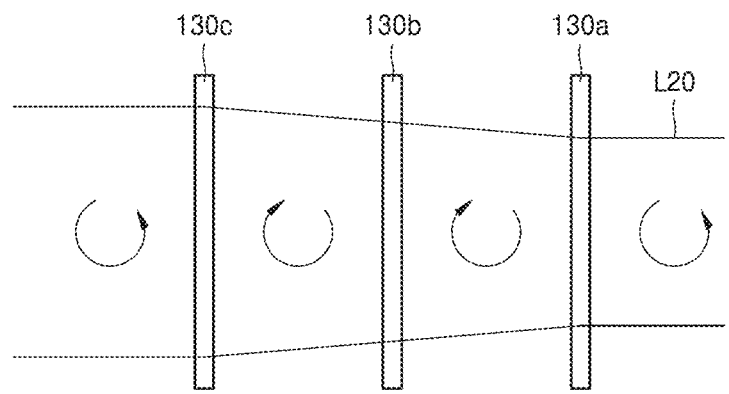

The polarization selective lens 130 may be realized in various manners. For example, FIGS. 2 and 3 are schematic cross-sectional views illustrating an example configuration and operation of the polarization selective lens 130 of the multi-image display apparatus 100 illustrated in FIG. 1. Referring to FIGS. 2 and 3, the polarization selective lens 130 may include two identical geometric phase lenses 130a and 130c and a polarization conversion plate 130b between the two identical geometric phase lenses 130a and 130c. The geometric phase lenses 130a and 130c are optical devices operating as convex lenses or concave lenses, based on a polarization characteristic of incident light. For example, the geometric phase lenses 130a and 130c may operate as convex lenses having a focal distance f with respect to light having a first circular polarization component and may operate as concave lenses having the focal distance f with respect to light having a second circular polarization component. Also, the geometric phase lenses 130a and 130c may change a polarization direction of transmitted light to the opposite direction. The polarization conversion plate 130b may operate to intactly transmit the light having the first circular polarization component and convert the light having the second circular polarization component into the light having the first circular polarization component. The polarization conversion plate 130b may be formed to be very thin, and thus, the polarization conversion plate 130b may be bonded between the two geometric phase lenses 130a and 130c to form the polarization selective lens 130.

When a first image L10 having the first circular polarization component is incident on the polarization selective lens 130, the first image L10 may pass through the geometric phase lens 130a acting as a convex lens, and a polarization state of the first image L10 may be changed to the second circular polarization component, as illustrated in FIG. 2. Then, the first image L10 may have the first circular polarization component again, by passing through the polarization conversion plate 130b that converts polarization of light having the second circular polarization component. Then, the first image L10 pass through the geometric phase lens 130c acting as a convex lens. Since the polarization conversion plate 130b is very thin, the two geometric phase lenses 130a and 130c of the polarization selective lens 130 substantially are adhered to each other. When two convex lenses adhere to each other, the focal distance reduces by half, and thus, the polarization selective lens 130 may operate as the convex lens having half of a focal distance with respect to the first image L10 having the first circular polarization component than a focal distance of each of the geometric phase lenses 130a and 130c, with respect to the first image L10 having the first circular polarization component.

Also, when a second image L20 having the second circular polarization component is incident on the polarization selective lens 130, the second image L20 may pass through the geometric phase lens 130a acting as a concave lens, and a polarization state of the second image L20 is changed to the first circular polarization component. The second image L20 that may have the first circular polarization component may maintain the first circular polarization component by passing through the polarization conversion plate 130b which intactly transmits light having the first circular polarization component. Then, the second image L20 may pass through the geometric phase lens 130c acting as a convex lens. Consequently, since the second image L20 passes through each of the concave lens and the convex lens once, the concave lens and the convex lens having the same focal distance, no optical effect may apply to the second image L20. Accordingly, the second image L20 having the second circular polarization component may pass through the polarization selective lens 130 without distortion.

The polarization selective lens 130 may have other configurations than the configuration described in FIGS. 2 and 3. For example, the polarization selective lens 130 may be configured by singularly using a geometric phase lens, a meta lens, a double refraction lens, a diffraction lens, etc., which have artificially designed minute diffractive patterns, or may be configured by combining at least two thereof.

When the polarization selective lens 130 described in FIGS. 2 and 3 is used, and when the first image reproduced by the light source 110 and the spatial light modulator 120 has the first circular polarization component, the polarization selective lens 130 may provide the first image L10 to a user's eye 160, as shown in FIG. 1, by focusing the first image. Also, when the second image L20, which is an image of the real world, has the second circular polarization component, the polarization selective lens 130 may intactly provide the second image L20 to the user's eye 160 without distortion. Then, the polarization selective lens 130 may intactly transmit the second image that is an image of the real world and may enlarge only the first image L10 reproduced by the light source 110 and the spatial light modulator 120, thereby increasing only an angle of view for the virtual image without distorting the image of the real world.

To this end, the ¼ wavelength plate 112, the beam splitter 113, and the circular polarization plate 114 may be configured to allow the first image L10 to have only the first circular polarization component and allow the second image L20 from a different path from the first image L10 to have only the second circular polarization component. For example, the ¼ wavelength plate 112 may be disposed on an optical path between the light source 110 and the beam splitter 113 and may delay a phase of light from the light source 110 by a ¼ wavelength, in order to convert linearly polarized light into circularly polarized light or convert the circularly polarized light into the linearly polarized light. FIG. 1 illustrates that the collimating lens 111 is disposed ahead of the ¼ wavelength plate 112 and closer to the light source 110. However, the location of the collimating lens 111 and the ¼ wavelength plate 112 may be the opposite. Also, the light source 110 may include a polarization laser emitting light linearly polarized in a first direction.

The circular polarization plate 114 may be disposed in front of a user to face the polarization selective lens 130. The circular polarization plate 114 may be configured to block the light having the first circular polarization component and transmit only the light having the second circular polarization component. The beam splitter 113 may be disposed on an optical path between the circular polarization plate 114 and the polarization selective lens 130. In particular, the beam splitter 113 may be disposed at a point at which an optical path of the first image L10 and an optical path of the second image L20 cross each other. The light source 110 and the spatial light modulator 120 may be disposed at both sides of the beam splitter 113 to face each other. In other words, the beam splitter 113 may be disposed on the optical path between the light source 110 and the spatial light modulator 120.

In this configuration, light L1 emitted from the light source 110 may have a first linear polarization component linearly polarized in a first direction. Also, the light L1 having the first linear polarization component may have the second circular polarization component by passing through the ¼ wavelength plate 112. Thereafter, the light L1 may pass through the beam splitter 113 and may be normally incident on a surface of the spatial light modulator 120. Then, the light L1 may be reflected by the spatial light modulator 120 and may have a travel direction that is changed by 180 degrees. The light L1 reflected by the spatial light modulator 120 to travel in the opposite direction may have a polarization direction that is changed to an opposite direction, thereby having the second circular polarization component. Also, the light L1 may be modulated by the spatial light modulator 120 to contain a hologram image. Thereafter, the light L1 may be incident on the beam splitter 113 at an angle again and reflected by the beam splitter 113 in a direction of 90 degrees and may reach the polarization selective lens 130 while having the first circular polarization component. The beam splitter 113 may include a half-transparent mirror simply reflecting a portion of incident light and transmitting the other portion of the incident light. The beam splitter 113 may include a polarization selective mirror reflecting the light having the first circular polarization component and transmitting the light having the second circular polarization component.

Light L2 from the outside may pass through the circular polarization plate 114 and may have only the second circular polarization component. The light L2 having the second circular polarization component may pass through the beam splitter 113 and reach the polarization selective lens 130. Thus, the first image L10 reproduced by the light source 110 and the spatial light modulator 120 may reach the polarization selective lens 130 while having the first circular polarization component and the second image L20 that is the image of the real world may reach the polarization selective lens 130 while having the second circular polarization component. Then, the first image L10 may be focused by the polarization selective lens 130 and the second image L20 may pass through the polarization selective lens 130 without distortion.

According to the example embodiment, the polarization selective lens 130 may be disposed in front of the user's eye 160 and may enlarge only the first image L10, and an angle of view of the multi-image display apparatus 100 with respect to the first image L10 may be increased. Also, the multi-image display apparatus 100 may provide the holographic image having a three-dimensional effect together with an actual external scene, and thus, a more realistic AR experience may be provided.

Figure 4:
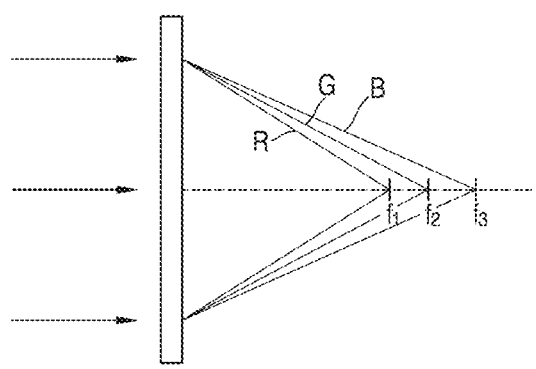
FIG. 4 is an example view illustrating a change in a focal distance of geometric phase lenses according to a wavelength of incident light.

Meanwhile, in a situation in which paraxial approximation is applied, multiplication of wavelengths and focal distances of lights passing through the geometric phase lenses 130a and 130c may be constant. In other words, red light having the longest wavelength is focused at a shortest distance and blue light having the shortest wavelength is focused at a longest distance. FIG. 4 is an example view illustrating a change in a focal distance of the geometric phase lenses 130a and 130c based on a wavelength of incident light. As illustrated in FIG. 4, the geometric phase lenses 130a and 130c may have a focal distance f1 with respect to red light R, a focal distance f2, which is greater than the focal distance f1, with respect to green light G, and a focal distance f3, which is greater than the focal distance f2, with respect to blue light B. For example, when the focal distance of the geometric phase lenses 130a and 130c with respect to the red light R is about 37.417 mm, the focal distance with respect to the green light G may be about 44.705 mm and the focal distance with respect to the blue light B may be about 50.618 mm. For example, when the focal distance of the geometric phase lenses 130a and 130c with respect to the red light R is about 41.607 mm, the focal distance with respect to the green light G may be about 49.705 mm and the focal distance with respect to the blue light B may be about 56.275 mm.

The second image from the actual external scene may pass through each of the geometric phase lenses 130a and 130c in a different circular polarization state, and thus, may obtain an effect of each of a concave lens and a convex lens. Thus, the second image from the actual external scene may be delivered to the user with corrected chromatic aberration by passing through the two geometric phase lenses 130a and 130c. However, the first image, which is the holographic image, may obtain two times the effect of the convex lens by passing through the two geometric phase lenses 130a and 130c. Thus, the first image may be delivered to the user with the chromatic aberration increased by two times. Consequently, the polarization selective lens 130 may have a great chromatic aberration with respect to the first image and may not have a chromatic aberration with respect to the second image.

According to the example embodiment, depths of a red holographic image, a green holographic image, and a blue holographic image, which are reproduced by the spatial light modulator 120, may be adjusted in advance, and thus, the chromatic aberration generated when the holographic images are delivered to the user may be compensated for. A color holographic image of one frame may have three color components having the same depth, that is, a red holographic image, a green holographic image, and a blue holographic image. However, since a focal distance of the polarization selective lens 130 with respect to the first image varies based on the wavelength, when the chromatic aberration is not compensated for, the red holographic image, the green holographic image, and the blue holographic image delivered to the user may have different depths. Thus, the chromatic aberration of the polarization selective lens 130 may be offset by adjusting in advance the depth of the red holographic image, the depth of the green holographic image, and the depth of the blue holographic image by using the spatial light modulator 120.

Figure 5A:
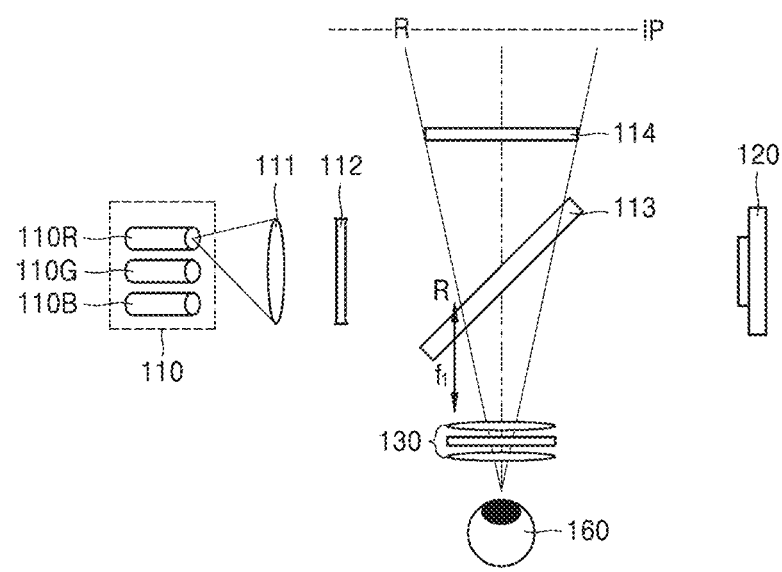
FIGS. 5A through 5C are schematic views illustrating an operation of the multi-image display apparatus illustrated in FIG. 1.
Figure 5B:
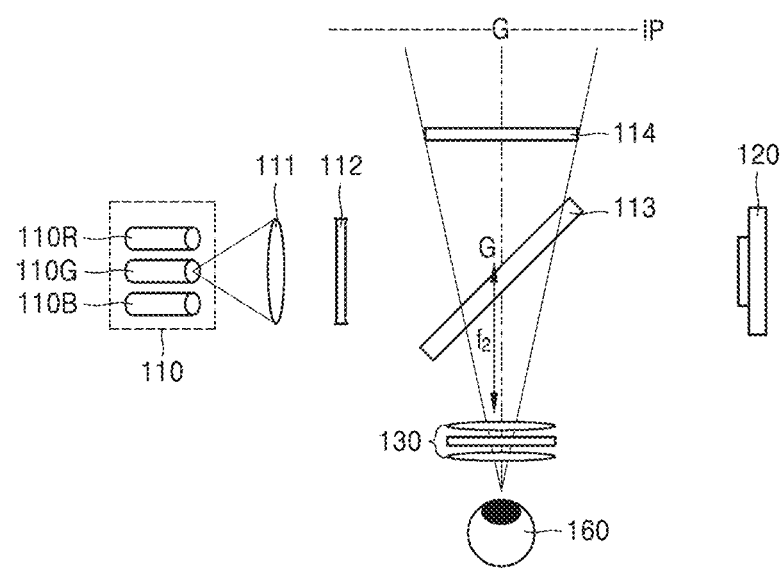
Figure 5C:
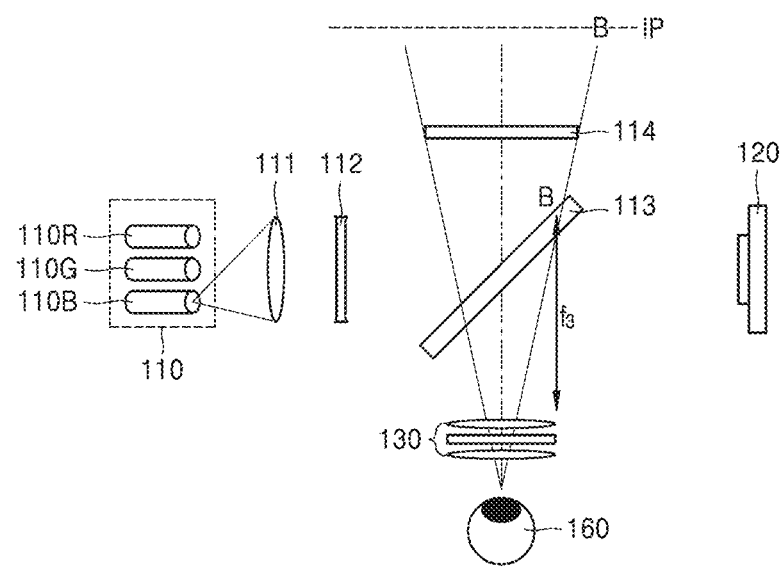

For example, FIGS. 5A through 5C are schematic views illustrating an operation of the multi-image display apparatus 100 illustrated in FIG. 1. Referring to FIGS. 5A through 5C, the multi-image display apparatus 100 may sequentially reproduce a red holographic image, a green holographic image, and a blue holographic image at different times from one another. The controller 140 may be configured to provide hologram data related to the red holographic image to the spatial light modulator 120, while the red light source 110R emits red light, provide hologram data related to the green holographic image to the spatial light modulator 120, while the green light source 110G emits green light, and provide hologram data related to the blue holographic image to the spatial light modulator 120, while the blue light source 110B emits blue light. In this process, the controller 140 may change depth information of the hologram data related to the red holographic image, depth information of the hologram data related to the green holographic image, and depth information of the hologram data related to the blue holographic image, in order to offset the chromatic aberration of the polarization selective lens 130.

First, referring to FIG. 5A, for a first period of time, the controller 140 may turn on only the red light source 110R and turn off the remaining green light source 110G and blue light source 110B. Also, the controller 140 may provide the hologram data related to the red holographic image to the spatial light modulator 120. The spatial light modulator 120 may form a hologram pattern for diffracting and modulating incident light based on the hologram data provided from the controller 140. Then, the red light may be reflected and diffracted by the spatial light modulator 120 so that the red holographic image R may be reproduced. The controller 140 may adjust a depth in which the red holographic image R is reproduced, by taking into account a focal distance f1 of the polarization selective lens 130 with respect to the red light. For example, the controller 140 may change the depth information of the hologram data such that the red holographic image R is reproduced in a location farther away than the focal distance f1 of the polarization selective lens 130 in a front direction of the polarization selective lens 130. Then, a user may view an enlarged virtual image of the red holographic image R on an image plane IP at a certain distance from the user.

Next, referring to FIG. 5B, for a second period of time, after the first period of time, the controller 140 may turn on only the green light source 110G and turn off the remaining red light source 110R and blue light source 110B. Also, the controller 140 may provide the hologram data related to the green holographic image to the spatial light modulator 120. Then, the green light may be reflected and diffracted by the spatial light modulator 120 so that the green holographic image G may be reproduced. The controller 140 may adjust a depth in which the green holographic image G is reproduced, by taking into account a focal distance f2 of the polarization selective lens 130 with respect to the green light. For example, the controller 140 may change the depth information of the hologram data such that the green holographic image G is reproduced in a location farther away than the focal distance f2 of the polarization selective lens 130 in a front direction of the polarization selective lens 130. Then, the user may view an enlarged virtual image of the green holographic image G on the image plane IP distanced from the user by a certain distance.

Next, referring to FIG. 5C, for a third period of time, after the second period of time, the controller 140 may turn on only the blue light source 110B and turn off the remaining red light source 110R and green light source 110G. Also, the controller 140 may provide the hologram data related to the blue holographic image to the spatial light modulator 120. Then, the blue light may be reflected and diffracted by the spatial light modulator 120 so that the blue holographic image B may be reproduced. The controller 140 may adjust a depth in which the blue holographic image B is reproduced, by taking into account a focal distance f3 of the polarization selective lens 130 with respect to the blue light. For example, the controller 140 may change the depth information of the hologram data such that the blue holographic image B is reproduced in a location farther away than the focal distance f3 of the polarization selective lens 130 in a front direction of the polarization selective lens 130. Then, the user may view an enlarged virtual image of the blue holographic image B on the image plane IP distanced from the user by a certain distance.

As a result, the user may view that the enlarged virtual image of the red holographic image R, the enlarged virtual image of the green holographic image G, and the enlarged virtual image of the blue holographic image B are located on the same image plane IP. Thus, the user may not experience the chromatic aberration of the polarization selective lens 130. Also, when the hologram images of one frame are rapidly reproduced by allowing the first through third period of times to be very limited, the user may view a complete color holographic image.

As shown above, hologram image of each color may be reproduced at a location farther away than the focal distance of the polarization selective lens 130 with respect to each corresponding color. However, example embodiments are not limited thereto, and the location at which the hologram image of each color is reproduced may vary based on a depth in which each enlarged virtual image is formed. For example, when a distance between the user and the image plane IP is changed, the location at which the hologram image of each color is reproduced may be changed. In this case, the controller 140 may change the depth information of the red holographic image R and the depth information of the blue holographic image B based on the green holographic image G based on the change in the distance between the user and the image plane IP.

For example, the controller 140 may adjust the depth information of the hologram data related to the red holographic image R, such that the red holographic image R has a depth in which the red holographic image R is closer to the polarization selective lens 130 than the green holographic image G by a difference between the focal distance f1 of the polarization selective lens 130 with respect to the red light and the focal distance f2 of the polarization selective lens 130 with respect to the green light. Also, the controller 140 may adjust the depth information of the hologram data related to the blue holographic image B, such that the blue holographic image B has a depth in which the blue holographic image B is farther from the polarization selective lens 130 than the green holographic image G by a difference between the focal distance f3 of the polarization selective lens 130 with respect to the blue light and the focal distance f2 of the polarization selective lens 130 with respect to the green light.

Referring to FIGS. 5A through 5C, the red holographic image R, the green holographic image G, and the blue holographic image B are time-sequentially reproduced, but example embodiments are not limited thereto. For example, the controller 140 may simultaneously turn on the red light source 110R, the green light source 110G, and the blue light source 110B to simultaneously emit the red light, the green light, and the blue light. Also, the controller 140 may provide holographic data in which the hologram data related to the red holographic image R, the hologram data related to the green holographic image G, and the hologram data related to the blue holographic image B are combined to the spatial light modulator 120. Also in this case, under the same principle as described above, the controller 140 may adjust the depth information of the hologram data related to the red holographic image R, the depth information of the hologram data related to the green holographic image G, and the depth information of the hologram data related to the blue holographic image B.

Figure 6:
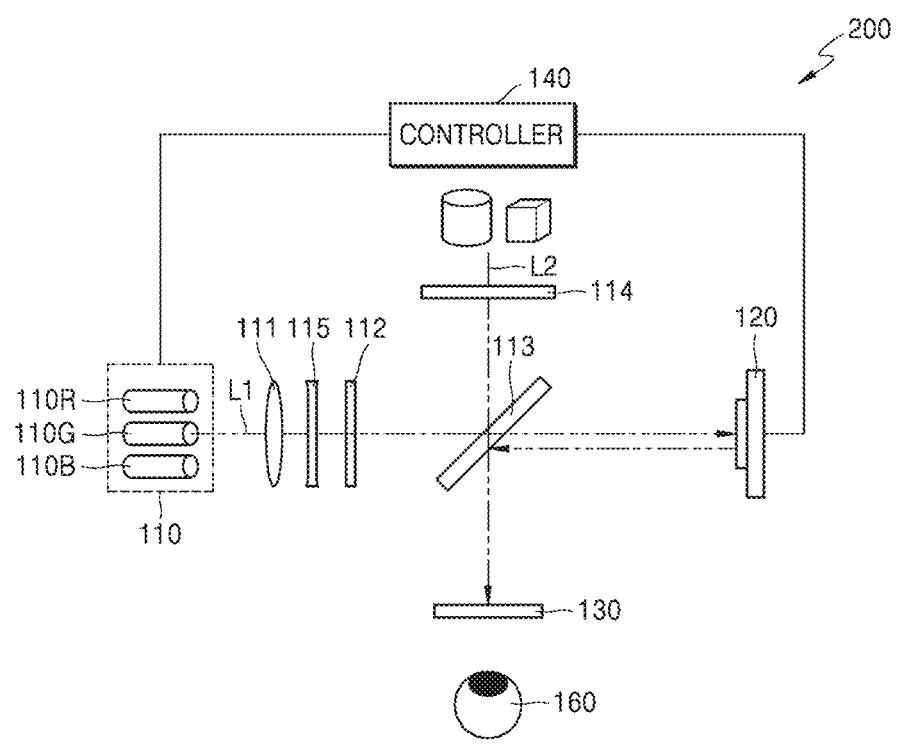
FIG. 6 is a schematic view illustrating a configuration of a multi-image display apparatus according to an example embodiment.

Meanwhile, multi-image display apparatuses for providing the holographic image based on various configurations may be realized, in addition to the multi-image display apparatus 100 illustrated in FIG. 1. FIG. 6 is a schematic view illustrating a configuration of a multi-image display apparatus 200 according to an example embodiment. Referring to FIG. 6, the multi-image display apparatus 200 according to an example embodiment may include the light source 110 and the spatial light modulator 120 disposed to face each other in a first direction, the circular polarization plate 114 and the polarization selective lens 130 disposed to face each other in a second direction, the beam splitter 113 disposed at a point in which an optical path between the light source 110 and the spatial light modulator 120 crosses an optical path between the circular polarization plate 114 and the polarization selective lens 130, the ¼ wavelength plate 112 between the light source 110 and the beam splitter 113, a linear polarization plate 115 between the light source 110 and the ¼ wavelength plate 112, the collimating lens 111 between the light source 110 and the linear polarization plate 115, and the controller 140 configured to control operations of the light source 110 and the spatial light modulator 120.

The multi-image display apparatus 200 illustrated in FIG. 6 may have substantially the same structure as the multi-image display apparatus 100 illustrated in FIG. 1, and may further include the linear polarization plate 115 disposed between the light source 110 and the ¼ wavelength plate 112. The linear polarization plate 115 may transmit only light having a first linear polarization component and may block light having a second linear polarization component orthogonal to the first linear polarization component. According to an example embodiment, the light source 110 may include a non-polarization laser, rather than a polarization laser. Light emitted from the light source 110 may be non-polarized light and may have the first linear polarization component by passing through the linear polarization plate 115. Other configurations and operations of the multi-image display apparatus 200 may be the same as those of the multi-image display apparatus 100 described with reference to FIG. 1.

Also, according to an example embodiment, the light source 110 may be a light-emitting diode (LED). The LED may have less spatial coherence than a laser. However, when light has at least a certain degree of spatial coherence, the light may be sufficiently diffracted and modulated by the spatial light modulator 120. When the light source 110 is an LED, non-polarized light is emitted from the light source 110, and thus, the multi-image display apparatus 200 may include the linear polarization plate 115. Any light sources 110 emitting light having spatial coherence may be used, in addition to the LED.

Figure 7:
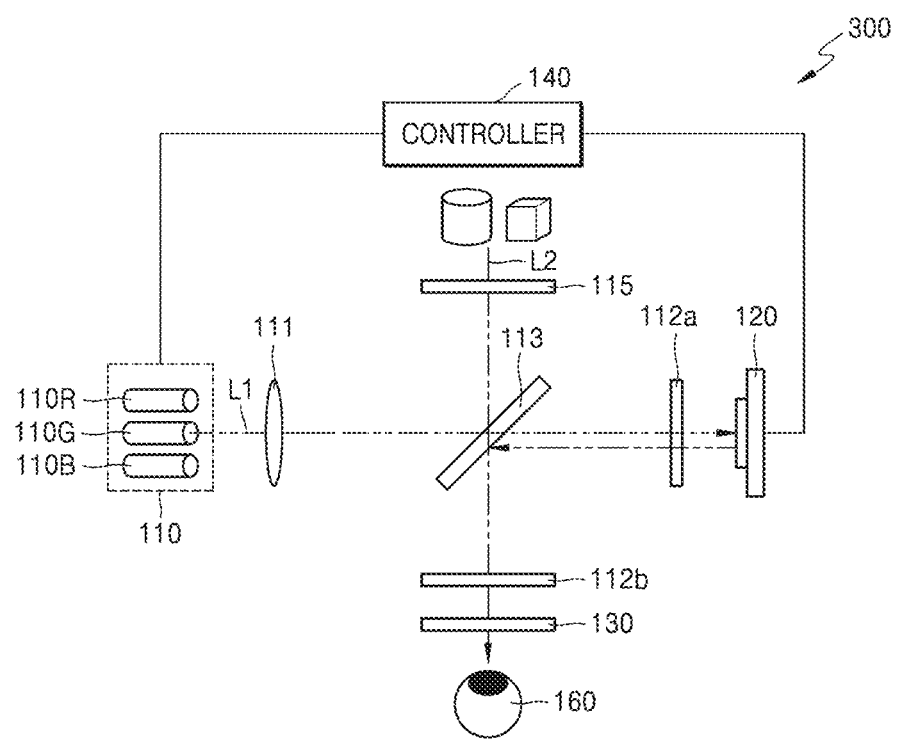
FIG. 7 is a schematic view illustrating a configuration of a multi-image display apparatus according to an example embodiment.

FIG. 7 is a schematic view illustrating a configuration of a multi-image display apparatus 300 according to an example embodiment. Referring to FIG. 7, the multi-image display apparatus 300 according to an example embodiment may include the light source 110 and the spatial light modulator 120 disposed to face each other in a first direction, the linear polarization plate 115 and the polarization selective lens 130 disposed to face each other in a second direction, the beam splitter 113 disposed at a point in which an optical path between the light source 110 and the spatial light modulator 120 crosses an optical path between the linear polarization plate 115 and the polarization selective lens 130, a first ¼ wavelength plate 112a between the beam splitter 113 and the spatial light modulator 120, a second ¼ wavelength plate 112b between the beam splitter 113 and the polarization selective lens 130, the collimating lens 111 between the light source 110 and the beam splitter 113, and the controller 140 configured to control operations of the light source 110 and the spatial light modulator 120.

The light source 110 may include a polarization laser. For example, light L1 emitted from the light source 110 may have only a first linear polarization component. The L1 having the first linear polarization component emitted from the light source 110 may pass through the beam splitter 113 and then through the first ¼ wavelength plate 112a so as to be changed to the light L1 having a second circular polarization component. Then, the light L1 may be normally incident on the spatial light modulator 120. The light L1 normally incident on the spatial light modulator 120 may be reflected by the spatial light modulator 120 to have a travel direction which is changed to an opposite direction by 180 degrees. Due to the change in the travel direction, the light L1 may have a first circular polarization component. The light L1 having the first circular polarization component may pass through the first ¼ wavelength plate 112a again to have a second linear polarization component. Thereafter, the light L1 may be reflected by the beam splitter 113 at an angle of about 90 degrees and may pass through the second ¼ wavelength plate 112b to have the first circular polarization component. Finally, the light L1 may be incident on the polarization selective lens 130 in a state in which the light L1 has the first circular polarization component.

Meanwhile, light L2 from the actual external scene may pass through the linear polarization plate 115. The linear polarization plate 115 may transmit only light having the first linear polarization component and may block light having the second linear polarization component orthogonal to the first linear polarization component. Thus, the light L2 passing through the linear polarization plate 115 may have the first linear polarization component. Thereafter, the light L2 may be incident on the second ¼ wavelength plate 112b by passing through the beam splitter 113. The light L2 may have the second circular polarization component by passing through the second ¼ wavelength plate 112b. Finally, the light L2 may be incident on the polarization selective lens 130 in a state in which the light L2 has the second circular polarization component.

The beam splitter 113 may include a half-transparent mirror reflecting a portion of incident light and transmitting the other portion of the incident light. The beam splitter 113 may include a polarization selective mirror transmitting the light having the first linear polarization component and reflecting the light having the second linear polarization component.

Figure 8:
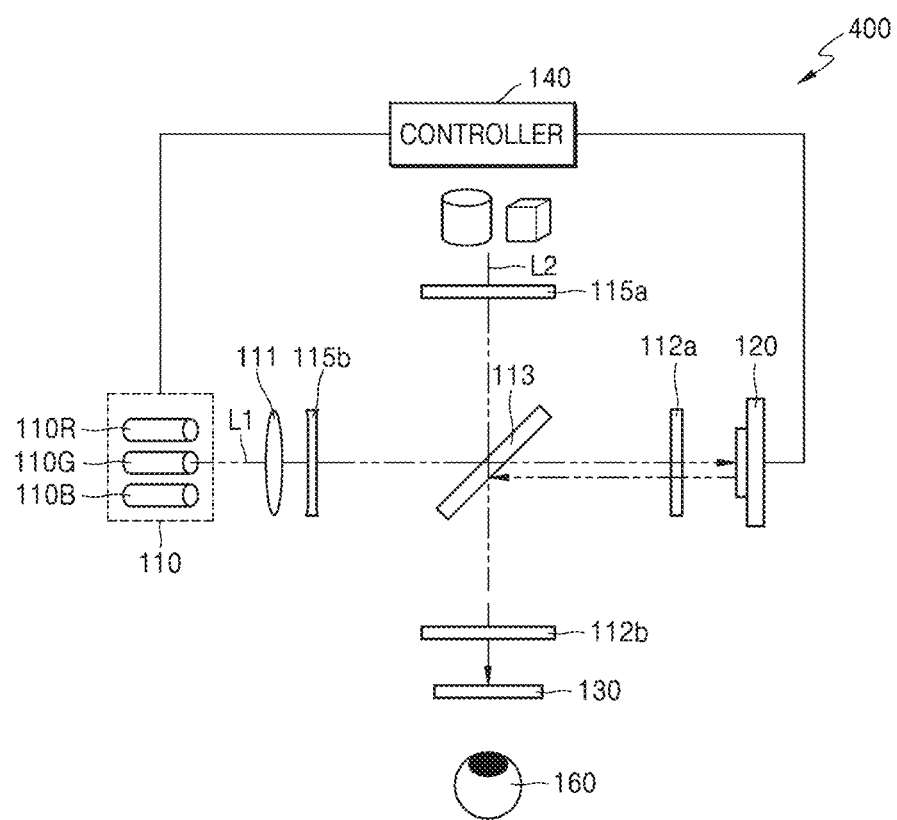
FIG. 8 is a schematic view illustrating a configuration of a multi-image display apparatus according to an example embodiment.

FIG. 8 is a schematic view illustrating a configuration of a multi-image display apparatus 400 according to an example embodiment. Referring to FIG. 8, the multi-image display apparatus 400 according to an example embodiment may include the light source 110 and the spatial light modulator 120 disposed to face each other in a first direction, a first linear polarization plate 115a and the polarization selective lens 130 disposed to face each other in a second direction, the beam splitter 113 disposed at a point in which an optical path between the light source 110 and the spatial light modulator 120 crosses an optical path between the first linear polarization plate 115a and the polarization selective lens 130, the first ¼ wavelength plate 112a between the beam splitter 113 and the spatial light modulator 120, the second ¼ wavelength plate 112b between the beam splitter 113 and the polarization selective lens 130, the collimating lens 111 between the light source 110 and the beam splitter 113, a second linear polarization plate 115b between the light source 110 and the beam splitter 113, and the controller 140 configured to control operations of the light source 110 and the spatial light modulator 120. FIG. 8 illustrates that the collimating lens 111 is disposed ahead of the second linear polarization plate 115b and closer to the light source 110. However, the location of the collimating lens 111 and the second linear polarization plate 115b may be the opposite.

The multi-image display apparatus 400 illustrated in FIG. 8 may have substantially the same structure as the multi-image display apparatus 300 illustrated in FIG. 7, and may further include the second linear polarization plate 115b disposed between the light source 110 and the beam splitter 113. The second linear polarization plate 115b may transmit only light having a first linear polarization component and may block light having a second linear polarization component orthogonal to the first linear polarization component. In the example embodiment illustrated in FIG. 8, the light source 110 may include a non-polarization laser rather than a polarization laser, or an LED. Light emitted from the light source 110 may be non-polarized light and may have the first linear polarization component by passing through the second linear polarization plate 115b. Other configurations and operations of the multi-image display apparatus 400 may be the same as those of the multi-image display apparatus 300 described with reference to FIG. 7.

Figure 9:
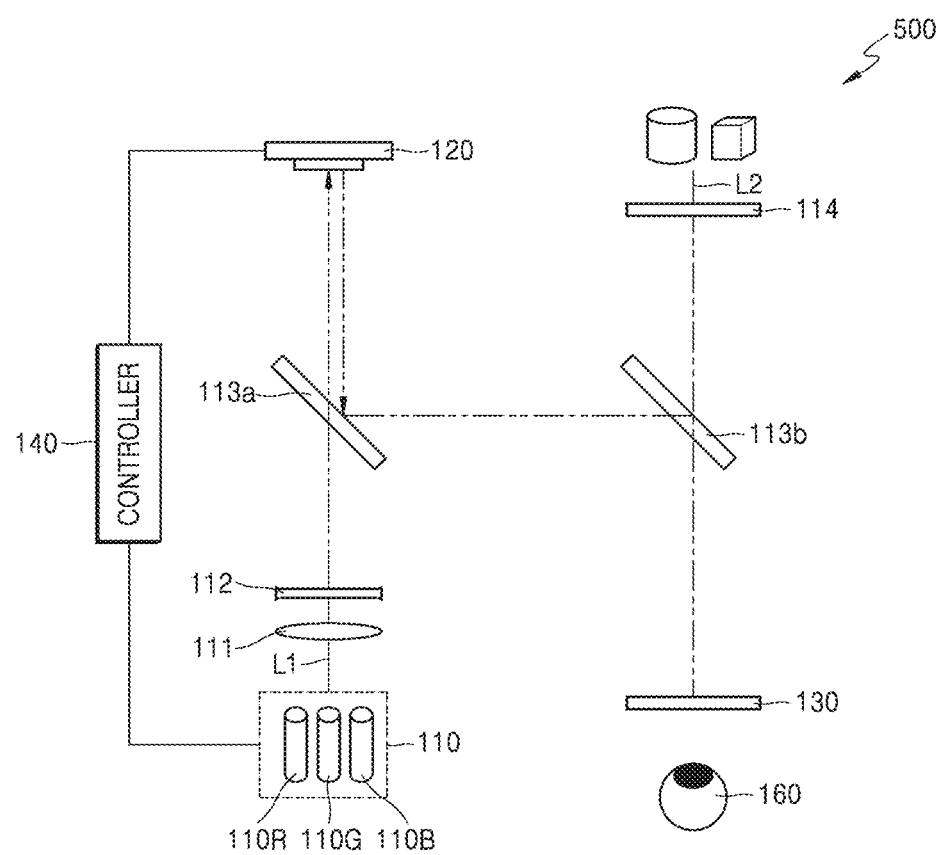
FIG. 9 is a schematic view illustrating a configuration of a multi-image display apparatus according to an example embodiment.

FIG. 9 is a schematic view illustrating a configuration of a multi-image display apparatus 500 according to an example embodiment. Referring to FIG. 9, the multi-image display apparatus 500 may include the light source 110 and the spatial light modulator 120 disposed to face each other in a first direction, a first beam splitter 113a disposed on an optical path between the light source 110 and the spatial light modulator 120, the collimating lens 111 disposed between the first beam splitter 113a and the light source 110, the ¼ wavelength plate 112 disposed between the first beam splitter 113a and the light source 110, the circular polarization plate 114 and the polarization selective lens 130 disposed to face each other in the first direction, a second beam splitter 113b on an optical path between the circular polarization plate 114 and the polarization selective lens 130, and the controller 140 configured to control operations of the light source 110 and the spatial light modulator 120. FIG. 9 illustrates that the collimating lens 111 is disposed ahead of the ¼ wavelength plate 112 and closer to the light source 110. However, the location of the collimating lens 111 and the ¼ wavelength plate 112 may be the opposite. The second beam splitter 113b may be disposed to face the first beam splitter 113a and may be disposed to reflect light L1 from the first beam splitter 113a and transmit light L2 from the circular polarization plate 114.

The light source 110 may include a polarization laser emitting the light L1 linearly polarized in the first direction. The light L1 may pass through the ¼ wavelength plate 112 to have a second circular polarization component and may be reflected by the spatial light modulator 120 to have a travel direction changed to an opposite direction, to have a first circular polarization component. Thereafter, the light L1 may be sequentially reflected by the first beam splitter 113a and the second beam splitter 113b at an angle of 90 degrees, and may be incident on the polarization selective lens 130 in a state in which the light L1 has the first circular polarization component.

Meanwhile, light L2 from the actual external scene may pass through the circular polarization plate 114. The circular polarization plate 114 may be configured to block light having the first circular polarization component and transmit only light having the second circular polarization component. Thus, the light L2 passing through the circular polarization plate 114 may pass through the second beam splitter 113b and may be incident on the polarization selective lens 130 in a state in which the light L2 has the second circular polarization component.

So far, example embodiments in which the spatial light modulator 120 is a reflective-type light modulator is described. However, the spatial light modulator 120 may be a transmissive-type light modulator. The transmissive-type light modulator may include, for example, a semiconductor modulator based on a compound semiconductor, such as gallium arsenide (GaAs), or a liquid crystal device (LCD). For example, FIG. 10 is a schematic view illustrating a configuration of a multi-image display apparatus 600 according to an example embodiment.

Figure 10:
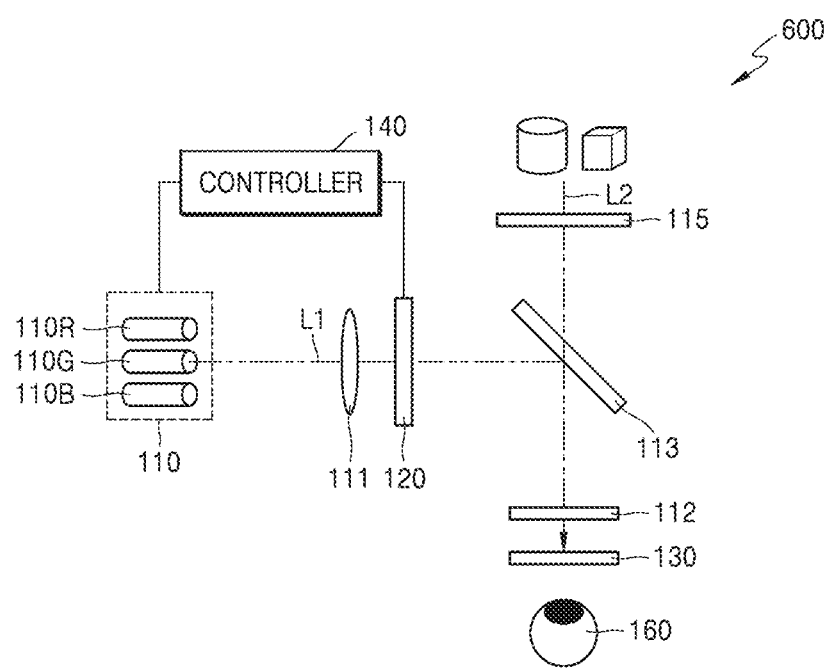
FIG. 10 is a schematic view illustrating a configuration of a multi-image display apparatus according to an example embodiment.

Referring to FIG. 10, the multi-image display apparatus 600 may include the linear polarization plate 115 and the polarization selective lens 130 disposed to face each other in a first direction, the beam splitter 113 disposed on an optical path between the linear polarization plate 115 and the polarization selective lens 130, the ¼ wavelength plate 112 between the beam splitter 113 and the polarization selective lens 130, the light source 110 disposed to face the beam splitter 113 in a second direction, the spatial light modulator 120 disposed between the light source 110 and the beam splitter 113, the collimating lens 111 disposed between the light source 110 and the spatial light modulator 120, and the controller 140 configured to control operations of the light source 110 and the spatial light modulator 120.

Light L2 from the actual external scene may pass through the linear polarization plate 115. The linear polarization plate 115 may be configured to block light having a second linear polarization component and transmit only light having a first linear polarization component. Thus, the light L2 passing through the linear polarization plate 115 may have the first linear polarization component. The light L2 may pass through the beam splitter 113 and may be incident on the ¼ wavelength plate 112. Thereafter, the light L2 having the first linear polarization component may pass through the ¼ wavelength plate 112 to be converted into second circular polarization light and may reach the polarization selective lens 130.

The light source 110 may include a polarization laser configured to emit light linearly polarized in the second direction. Light L1 emitted from the light source 110 may be diffracted and modulated by passing through the spatial light modulator 120. Thereafter, the light L1 may be reflected by the beam splitter 113 at an angle of about 90 degrees and may be incident on the ¼ wavelength plate 112. The light L1 having the second linear polarization component may be converted into first circular polarization light by passing through the ¼ wavelength plate 112 and may reach the polarization selective lens 130. Alternatively, the light source 110 may include a non-polarization laser or an LED. In this case, a linear polarization plate may further be disposed on the optical path between the light source 110 and the beam splitter 113, the linear polarization plate being configured to block light having the first linear polarization component and transmitting only light having the second linear polarization component.

The beam splitter 113 may include a half-transparent mirror simply reflecting a portion of incident light and transmitting the other portion of the incident light. The beam splitter 113 may include a polarization selective mirror transmitting light having the first linear polarization component and reflecting light having the second linear polarization component.

Figure 11:
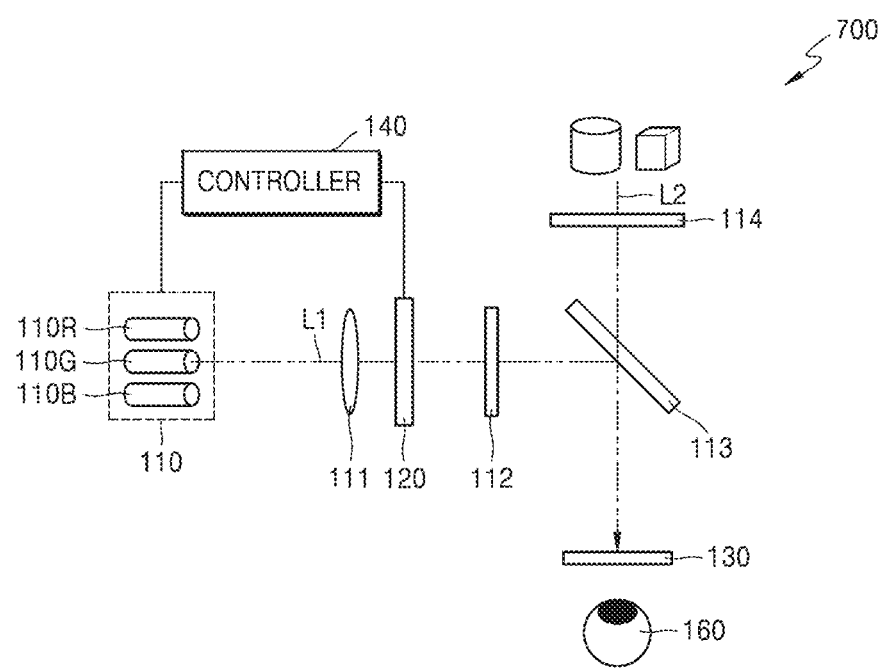
FIG. 11 is a schematic view illustrating a configuration of a multi-image display apparatus according to an example embodiment.

Also, FIG. 11 is a schematic view illustrating a configuration of a multi-image display apparatus 700 according to an example embodiment. Referring to FIG. 11, the multi-image display apparatus 700 may include the circular polarization plate 114 and the polarization selective lens 130 disposed to face each other in a first direction, the beam splitter 113 disposed on an optical path between the circular polarization plate 114 and the polarization selective lens 130, the light source 110 disposed to face the beam splitter 113 in a second direction, the spatial light modulator 120 disposed between the light source 110 and the beam splitter 113, the collimating lens 111 between the light source 110 and the spatial light modulator 120, the ¼ wavelength plate 112 on an optical path between the light source 110 and the beam splitter 113, and the controller 140 configured to control operations of the light source 110 and the spatial light modulator 120.

The light source 110 may include a polarization laser configured to emit light linearly polarized in the second direction. Light L1 emitted from the light source 110 may be diffracted and modulated by passing through the spatial light modulator 120. Thereafter, the light L1 having the second linear polarization component may be converted into first circular polarization light by passing through the ¼ wavelength plate 112. FIG. 11 illustrates that the ¼ wavelength plate 112 is disposed between the spatial light modulator 120 and the beam splitter 113. However, the location of the ¼ wavelength plate 112 is not limited thereto. The ¼ wavelength plate 112 may be disposed at any locations of the optical path between the light source 110 and the beam splitter 113. The light L1 having the first circular polarization component may be reflected by the beam splitter 113 at an angle of about 90 degrees and then may reach the polarization selective lens 130.

The light source 110 may include a non-polarization laser or an LED. In this case, a linear polarization plate configured to block light having a first linear polarization component and transmit only light having the second linear polarization component may further be disposed between the light source 110 and the ¼ wavelength plate 112. According to an example embodiment, when the light source 110 includes a non-polarization laser or an LED, the ¼ wavelength plate 112 may be eliminated, and instead, a circular polarization plate 114 configured to block light having a second circular polarization component and transmit only light having a first circular polarization component may be disposed on the optical path between the light source 110 and the beam splitter 113.

Light L2 from the actual external scene may pass through the circular polarization plate 114. The circular polarization plate 114 may be configured to block the light having the first circular polarization component and transmit only the light having the second circular polarization component. Thus, the light L2 passing through the circular polarization plate 114 may have the second circular polarization component. The light L2 may reach the polarization selective lens 130 in a state in which the light L2 has the second circular polarization component by passing through the beam splitter 113.

The beam splitter 113 may include a half-transparent mirror simply reflecting a portion of incident light and transmitting the other portion of the incident light. The beam splitter 113 may include a polarization selective mirror transmitting the light having the second circular polarization component and reflecting the light having the first circular polarization component.

Figure 12:
FIGS. 12 through 14 are views illustrating example electronic apparatuses in which a multi-image display apparatus according to an example embodiment may be implemented.
Figure 13:
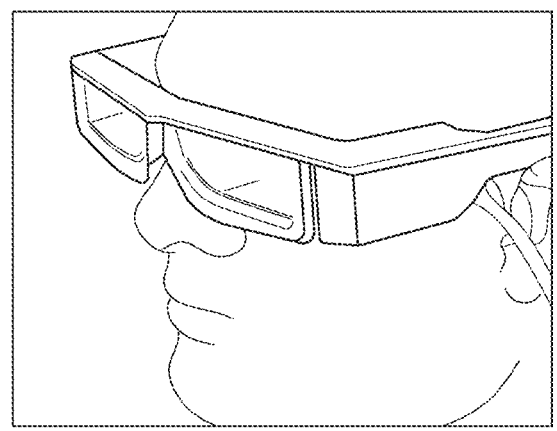
Figure 14:
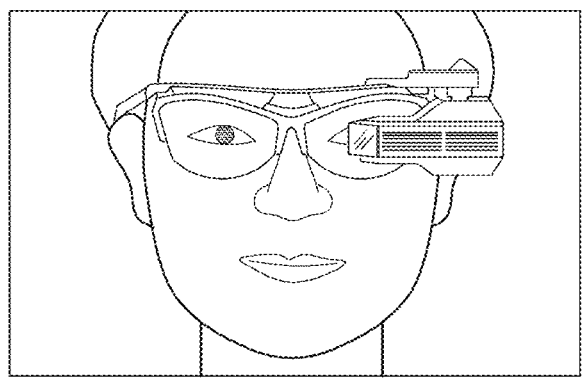

FIGS. 12 through 14 illustrate example electronic apparatuses in which the multi-image display apparatuses 100 through 700 described above may be implemented. As illustrated in FIGS. 12 through 14, at least one or more of the multi-image display apparatuses 100 through 700 according to example embodiments may be included in wearable devices. In other words, the multi-image display apparatuses 100 through 700 may be implemented in the wearable devices. For example, the multi-image display apparatuses 100 through 700 may be implemented in a head mounted display (HMD). Also, the multi-image display apparatuses 100 through 700 may be implemented in a glasses-type display, a goggle-type display, etc. The wearable electronic devices illustrated in FIGS. 12 through 14 may operate in interconnection with a smart phone.

Additionally, the multi-image display apparatuses 100 through 700 according to example embodiments may be included in a smartphone, or a smartphone may be used as the multi-image display apparatus. In other words, the multi-image display apparatuses 100 through 700 may be implemented in a small electronic device, such as a mobile electronic device. In addition, the fields in which the multi-image display apparatuses 100 through 700 according to example embodiments may be implemented may vary. For example, the multi-image display apparatuses 100 through 700 according to example embodiments may be implemented to realize not only AR but also MR and may also be implemented in other fields. In other words, in addition to the AR or the MR, the disclosure based on example embodiments described above may be applied to a display capable of simultaneously viewing a plurality of images.

The above multi-image display apparatuses providing a holographic image are described with reference to the example embodiments illustrated in the drawings. However, it may be understood by one of ordinary skill in the art that they are only examples and various modifications and equivalent embodiments are possible based on the multi-image display apparatuses.

It should be understood that example embodiments described herein should be considered in a descriptive sense only and not for purposes of limitation. Descriptions of features or aspects within each embodiment should typically be considered as available for other similar features or aspects in other embodiments.

While example embodiments have been described with reference to the figures, it will be understood by one of ordinary skill in the art that various changes in form and details may be made therein without departing from the spirit and scope as defined by the following claims.

What is claimed is:
1. A multi-image display apparatus comprising:
   a light source configured to emit a first wavelength light, a second wavelength light, and a third wavelength light;
   a spatial light modulator configured to modulate each of the first wavelength light, the second wavelength light, and the third wavelength light to form a first image comprising a first color holographic image, a second color holographic image, and a third color holographic image;
a polarization selective lens configured to focus the first image having only a first polarization component and transmit a second image having only a second polarization component without refraction, the second image being provided to the polarization selective lens along a different path from the first image; and
a controller configured to provide first hologram data corresponding to the first wavelength light, second hologram data corresponding to the second wavelength light, and third hologram data corresponding to third wavelength light to the spatial light modulator,
wherein chromatic aberration of the polarization selective lens is offset by adjusting a depth of the first color holographic image, a depth of the second color holographic image, and a depth of the third color holographic image,
wherein the polarization selective lens has a first focal distance with respect to the first wavelength light, a second focal distance that is greater than the first focal distance with respect to the second wavelength light, and a third focal distance that is greater than the second focal distance with respect to the third wavelength light, and
wherein the controller is further configured to adjust depth information of the first hologram data such that the first color holographic image reproduced by the spatial light modulator has a depth in which the first color holographic image is closer to the polarization selective lens than the second color holographic image by a difference between the first focal distance and the second focal distance,
and adjust depth information of the third hologram data such that the third color holographic image reproduced by the spatial light modulator has a depth in which the third color holographic image is closer to the polarization selective lens than the second color holographic image by a difference between the third focal distance and the second focal distance.

2. The multi-image display apparatus of claim 1, wherein the light source comprises a first light source configured to emit the first wavelength light, a second light source configured to emit the second wavelength light, and a third light source configured to emit the third wavelength light.

3. The multi-image display apparatus of claim 2, wherein the controller is further configured to provide the first hologram data to the spatial light modulator while the first light source emits the first wavelength light, provide the second hologram data to the spatial light modulator while the second light source emits the second wavelength light, and provide the third hologram data to the spatial light modulator while the third light source emits the third wavelength light.

4. The multi-image display apparatus of claim 2,
wherein the controller is further configured to provide hologram data to the spatial light modulator while the first light source, the second light source, and the third light source simultaneously emit the first wavelength light, the second wavelength light, and the third wavelength light, respectively.

5. The multi-image display apparatus of claim 1, further comprising:
a first polarization plate configured to transmit only the second polarization component from the second image;
a beam splitter disposed on an optical path between the first polarization plate and the polarization selective lens; and
a ¼ wavelength plate disposed between the beam splitter and the light source.

6. The multi-image display apparatus of claim 5, wherein the beam splitter is disposed on an optical path between the light source and the spatial light modulator, and
wherein the spatial light modulator comprises a reflective-type light modulator configured to modulate reflected light.

7. The multi-image display apparatus of claim 5, wherein the light source comprises a laser light source configured to emit light having a first linear polarization component, and
wherein the first polarization component comprises a first circular polarization component, and the second polarization component comprises a second circular polarization component having a rotational direction opposite to a rotational direction of the first circular polarization component.

8. The multi-image display apparatus of claim 7, wherein the beam splitter comprises a half-transparent mirror configured to reflect a portion of incident light and transmit a remaining portion of the incident light.

9. The multi-image display apparatus of claim 7, wherein the beam splitter comprises a polarization selective mirror configured to reflect light having the first circular polarization component and transmit light having the second circular polarization component.

10. The multi-image display apparatus of claim 5, wherein the light source comprises a light-emitting diode configured to emit non-polarized light,
wherein the multi-image display apparatus further comprises a second polarization plate disposed between the light source and the 1/4 wavelength plate, and configured to transmit only the first linear polarization component, and
wherein the first polarization component comprises a first circular polarization component, and the second polarization component comprises a second circular polarization component having a rotational direction opposite to a rotational direction of the first circular polarization component.

11. The multi-image display apparatus of claim 1, further comprising:
a first linear polarization plate configured to transmit only a first linear polarization component from the second image;
a beam splitter on an optical path between the first linear polarization plate and the polarization selective lens;
a first ¼ wavelength plate between the beam splitter and the spatial light modulator; and
a second ¼ wavelength plate between the beam splitter and the polarization selective lens,
wherein the first polarization component comprises a first circular polarization component, and the second polarization component comprises a second circular polarization component having a rotational direction opposite to a rotational direction of the first circular polarization component.

12. The multi-image display apparatus of claim 11, wherein the beam splitter is disposed on an optical path between the light source and the spatial light modulator, and the spatial light modulator comprises a reflective-type light modulator configured to modulate reflected light.

13. The multi-image display apparatus of claim 11, wherein the light source comprises a laser light source configured to emit light having the first linear polarization component.

14. The multi-image display apparatus of claim 11, wherein the light source comprises a light-emitting diode configured to emit non-polarized light, and
wherein the multi-image display apparatus further comprises a second linear polarization plate disposed between the light source and the beam splitter and configured to transmit only the first linear polarization component.

15. The multi-image display apparatus of claim 11, wherein the beam splitter comprises a polarization selective mirror configured to transmit light having the first linear polarization component and reflect light having a second linear polarization component that is orthogonal to the first linear polarization component.

16. The multi-image display apparatus of claim 1, further comprising:
a linear polarization plate configured to transmit only a first linear polarization component from the second image;
a beam splitter disposed on an optical path between the linear polarization plate and the polarization selective lens; and
a ¼ wavelength plate disposed between the beam splitter and the polarization selective lens,
wherein the first polarization component comprises a first circular polarization component, and the second polarization component comprises a second circular polarization component having a rotational direction opposite to a rotational direction of the first circular polarization component.

17. The multi-image display apparatus of claim 16, wherein the spatial light modulator is disposed on an optical path between the light source and the beam splitter, and the spatial light modulator comprises a transmissive-type light modulator configured to modulate transmitted light.

18. The multi-image display apparatus of claim 16, wherein the light source comprises a laser light source configured to emit light having a second linear polarization component that is orthogonal to the first linear polarization component.

19. The multi-image display apparatus of claim 1, further comprising:
a polarization plate configured to transmit only the second polarization component from the second image;
a beam splitter disposed on an optical path between the polarization plate and the polarization selective lens; and
a ¼ wavelength plate disposed between the spatial light modulator and the beam splitter,
wherein the spatial light modulator comprises a transmissive-type light modulator disposed between the light source and the beam splitter and configured to modulate transmitted light, and
wherein the light source comprises a laser light source configured to emit light having a second linear polarization component that is orthogonal to a first linear polarization component.

20. The multi-image display apparatus of claim 1, further comprising:
a first beam splitter disposed between the light source and the spatial light modulator;
a ¼ wavelength plate disposed between the first beam splitter and the light source;
a polarization plate configured to transmit only the second polarization component from the second image; and
a second beam splitter disposed on an optical path between the polarization plate and the polarization selective lens,
wherein the second beam splitter is configured to reflect light having the first polarization component from the first beam splitter and transmit light having the second polarization component from the polarization plate.

21. The multi-image display apparatus of claim 20, wherein the spatial light modulator comprises a reflective-type light modulator configured to modulate reflected light.

22. The multi-image display apparatus of claim 21, wherein the light source comprises a laser light source configured to emit light having a first linear polarization component, and
wherein the first polarization component comprises a first circular polarization component, and the second polarization component comprises a second circular polarization component having a rotational direction opposite to a rotational direction of the first circular polarization component.

23. A multi-image display apparatus comprising:
a light source configured to emit a first wavelength light, a second wavelength light, and a third wavelength light;
a spatial light modulator configured to modulate the first wavelength light, the second wavelength light, and the third wavelength light to form a first image comprising a first color holographic image, a second color holographic image, and a third color holographic image;
a controller configured to provide to the spatial light modulator first hologram data corresponding to the first wavelength light, a second hologram data corresponding to the second wavelength light, and a third hologram data corresponding to the third wavelength light; and
a polarization selective lens configured to focus the first image having a first polarization component and transmit a second image having a second polarization component without refraction;
wherein the controller is further configured to offset chromatic aberration of the polarization selective lens by adjusting a depth of the first hologram data, a depth of the second hologram data, and a depth of the third hologram data such that the first color holographic image, the second color holographic image, and the third color holographic image are focused on a same image plane,
wherein the polarization selective lens has a first focal distance with respect to the first wavelength light, a second focal distance that is greater than the first focal distance with respect to the second wavelength light, and a third focal distance that is greater than the second focal distance with respect to the third wavelength light, and
wherein the controller is further configured to adjust depth information of the first hologram data such that the first color holographic image reproduced by the spatial light modulator has a depth in which the first color holographic image is closer to the polarization selective lens than the second color holographic image by a difference between the first focal distance and the second focal distance, and adjust depth information of the third hologram data such that the third color holographic image reproduced by the spatial light modulator has a depth in which the third color holographic image is closer to the polarization selective lens than the second color holographic image by a difference between the third focal distance and the second focal distance.

24. The multi-image display apparatus of claim 23, wherein the polarization selective lens comprises two geometric phase lenses and a polarization conversion plate disposed between the two geometric phase lenses,
   wherein each of the two geometric phase lenses are configured to operate as convex lens or concave lens based on a polarization component of incident light.

* * * * *